Sept. 29, 1942.  W. JAHN ET AL  2,297,413
TUBING
Filed Feb. 28, 1940

Inventors
WILLY JAHN + WILLI LÜDER
By C. P. Goepel.
ATTORNEY.

Patented Sept. 29, 1942

2,297,413

UNITED STATES PATENT OFFICE 2,297,413

TUBING

Willy Jahn, Hanover, and Willi Lüder, Hanover-Linden, Germany; vested in the Alien Property Custodian Application February 28, 1940, Serial No. 321,196
In Germany June 23, 1937

1 Claim. (Cl. 138—56)

This invention relates to tubings of rubber and fabric which are used for the purpose of conducting hydrocarbons, lubricants, fuel mixtures and the like.

In the tubing heretofore used, the rubber in the rubberized fabric of the tubing is subjected to the decomposing action of liquids and the like, and is generally dissolved after a very short time, so that the fabric, thus made free from the adhesive qualities of the rubber, is loosened and tends to separate and pass out from the tubing in shreds, or otherwise become loosened.

To overcome these defects, it has been the practice to employ wire spirals in addition to the rubber, which spirals serve the purpose of maintaining the fabric lining in position and preventing it from coming loose. The introduction of wire spirals in tubing has resulted in basic drawbacks. When transporting such tubing it is necessary to form the same in coils of comparatively large curvature, and when transported on drums the drums must have large diameters. This requires, in turn, a large storage space. These and other disadvantages have prevented such wire spiral tubings from being generally used.

The object of this invention is to provide a tubing or hose in which the inner exposed layer of vulcanized fabric is mechanically attached to other layers of the tubing, and then all layers are vulcanized, so that the melted rubber flows over the fastening means thereby preventing their formerly exposed surfaces from being influenced by the corrosive acting substances passing through the tubing.

The invention consists also of an inner tube in which layers are joined together combined with an outer tube, or layers, and then vulcanizing the inner tube and outer tube or layer.

It is another object of this invention to provide the material of which the novel type tubing is made, which material may be made in a flattened condition, so that it can be folded together or be rolled up into a bundle of comparatively small size and requiring the least amount of space.

The invention consists in an inner lining in the form of a tube which can be produced and prepared independently of the outer tube to be subsequently built into the latter or to be used for the building up of the usual tubing.

The essential of the invention is to join the fabric and rubber by sewing, stapling, clamping, or the like, preferably so, that should such part of the stitching be severed, or the stapling or clamping or the like become unloosened in one place, other parts so stitched, stapled or clamped will remain tight, and to carry out this joining of fabric and rubber prior to vulcanization, so that the vulcanizing will bring about an integral whole incapable of being severed when acted upon by hydrocarbons, lubricants, fuel mixtures and the like.

The improved tube embodies these actions, and the improved method carries out step by step the essentials of joining and vulcanizing after the parts have been joined, the important part being the step of vulcanization after the joining has been completed.

The invention will be fully described hereinafter, embodiments thereof shown in the drawing, and the invention will be finally pointed out in the claim.

In the accompanying drawing.

Similar characters of reference indicate corresponding parts throughout the various views.

Figure 1:
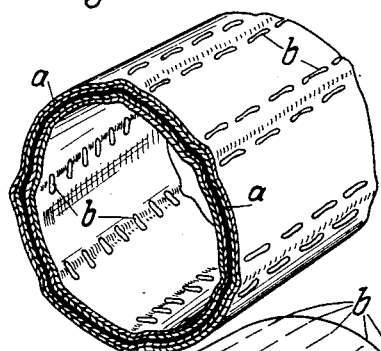
Figure 1 is a perspective, cross sectional view of my inner lining or tube built in several sections.
Figure 2:
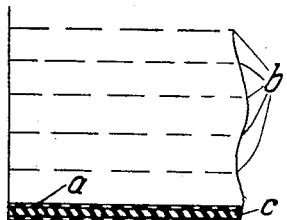
Figure 2 is a cross sectional view of part of the inner tube material shown in a flat state.

Referring to the drawing and more particularly to Figures 1 and 2, the material of the inner lining or tubing is shown to comprise two layers $a$ built up from a series of sheets or layers of fabric and having therebetween a rubber intermediate layer $c$.

These layers $a$ and $c$ are connected and held together by means of a sewing or stitching operation, which may consist in producing either separate and independent stitches, or a series of continuous stitches.

The stitches or seams $b$ are preferably arranged in a longitudinal direction, but they may also run transversely, diagonally, or in any other direction.

In cases where the layers $a$ and $c$ can be sewed together while in a flattened condition, it is possible to use simple shoemakers' sewing machines, in consequence whereof the sewing process is facilitated and simplified.

Layers a and c can also be held together by other means than stitches and sewing. These means may comprise rivets, eyelets and wire clamps g or the like and which, similar to the stitches, are distributed over the whole periphery and length of these layers, or if applied to the same while flat, may be distributed over the whole area in suitable arrangements.

After the layers a and c have been interconnected in the various manners described, they may then form a tubular, inner lining such as that shown in Figure 1.

Figure 3:
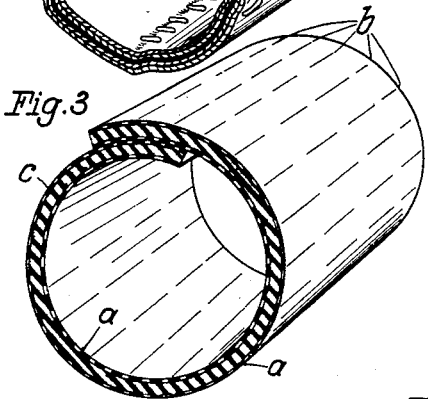
Figure 3 is a perspective cross sectional view of the material of Figure 2 fashioned in tubular form.

If the layers a and c have been joined, while in a flat state, they may then be bent into a tubular form as that shown in Figure 3.

Thereafter the inner tube or lining of either Figure 1 or Figure 3 may be introduced into an outer tubing, if circumstances so require, or it may preferably be used to build up the complete tubing in the usual manner upon the thus prepared layers.

Figure 4:
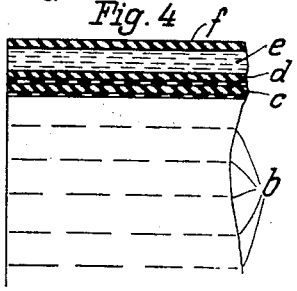
Figure 4 is a cross sectional view of part of the completed tubing.

In such a case of introducing the inner lining into an outer tubing, the outer face of the inner tube is provided with a rubber layer d, Figure 4. Thereafter, one or more fabric layers or inserts e are added, which serve the purpose of taking up the pressure, and finally the outside rubber coating f is added to complete the structural combination of the various elements.

Figure 5:
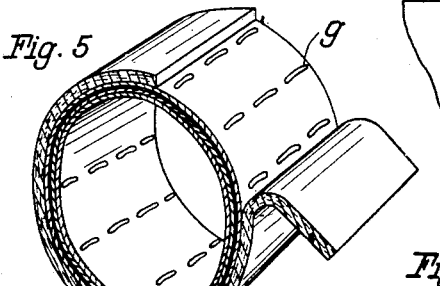
Figure 5 is a perspective, cross sectional view of a completed tubing with a portion of the outer wall partly separated.

Figure 5, which illustrates a finished tubing in circular section, clearly shows the outer face of the inner tube and which in this instance has its layers joined by means of wire clamps g.

Figure 6:
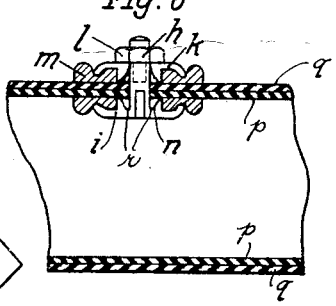
Figure 6 shows in elevation a cross section of a completed tubing provided with a clamping device.
Figure 7:
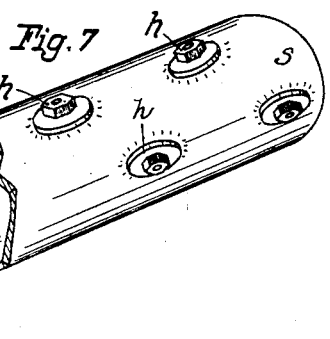
Figure 7 is a perspective, partly sectional view of a completed tubing, showing the arrangement of the clamping devices within the tubing wall.

In the case of tubing of comparatively small diameter, it is sometimes difficult to join the various layers by either sewing, riveting or similar operations. In such cases the binding of the inner layers or lining is affected directly with the outer tubing, namely, by means of screw clamps which pass through both the outer tubing and the inner lining. This form is shown in Figures 6 and 7, wherein the inner lining or tube p and the outer tube q are pierced by a clamp screw h of which its flat and large diameter head i located on the inner surface of the tubing and is made to rest on a fibre disc m. The nut l screwed onto the threaded stud of the clamp screw h, protruding from the tubing, is pressed against a washer k which rests on a second fabric disc m in contact with the outer surface of tube q.

Both the head of the clamp screw h and the washer k are provided with chamfered cavities or annular chambers r which are filled with rubber n, thereby forming means which will firmly tighten the clamp and make it leafproof after the tubing has been vulcanized.

Figure 7 shows a tubing s with the described clamp screws h and illustrates their distribution at intervals over its entire length and periphery.

The invention provides an inner self-contained tube, which may be readily joined to an outer tube, and creates amongst other advantages, the possibilities of making tubings of comparatively small diameter, which, as shown by the means employed in Figures 6 and 7, may be easily produced and, if required, quickly strengthened by attaching additional clamp screws h, of which insertion can be performed without special implements.

The invention shown and described comprises the particular advantages that the liquid-contacting fabric of the inner lining is permanently held and located by the stitching or clamping means in many different places, so that the exposed, unsupported fabric areas can be made small and of a magnitude to positively prevent a loosening of the fabric.

A further advantage of this invention consists in the new process of manufacturing tubing adapted for conducting substances which act with decomposing effect on the inner walls of tubing. The process, which comprises making first the inner lining or tube as a self-contained unit, and by securing its layers and attaching them to each other by piercing their walls and mechanically connecting the same by the various means disclosed, definitely creates the advantage that not only the inner exposed fabric is kept in a fixed position, even after the rubber has been decomposed, but that also the finished product is now lighter in weight and less bulky than tubing provided with wire spirals held against its inner wall, and the improved product can be readily flattened for ready winding on a drum or other transporting means, which was not possible with the tubings using spirals.

It is obvious that various changes and modifications may be made in the details of construction and design of the above specifically described embodiments of this invention without departing from the spirit thereof, such changes and modifications being restricted only by the scope of the following claim.

What is claimed is:

An article of manufacture, a tubing having an inner lining of layers of rubberized fabric, said lining having layer-fastening means comprising layer-piercing shafts distributed at intervals at several places throughout the length of said lining to hold said lining layers together, and having a vulcanized rubber covering over both said elements and the inner surface of said lining substantially insensitive against corrosive substances made to contact therewith, in passing thereover, the rubber of said fabric and the rubber surrounding said shafts being also vulcanized.

WILLY JAHN.
WILLI LÜDER.